Dec. 17, 1935. H. O. LINDGREN Re. 19,790
PROCESS OF PRODUCING CONICAL DISKS FOR CENTRIFUGAL SEPARATORS
Original Filed Oct. 12, 1929
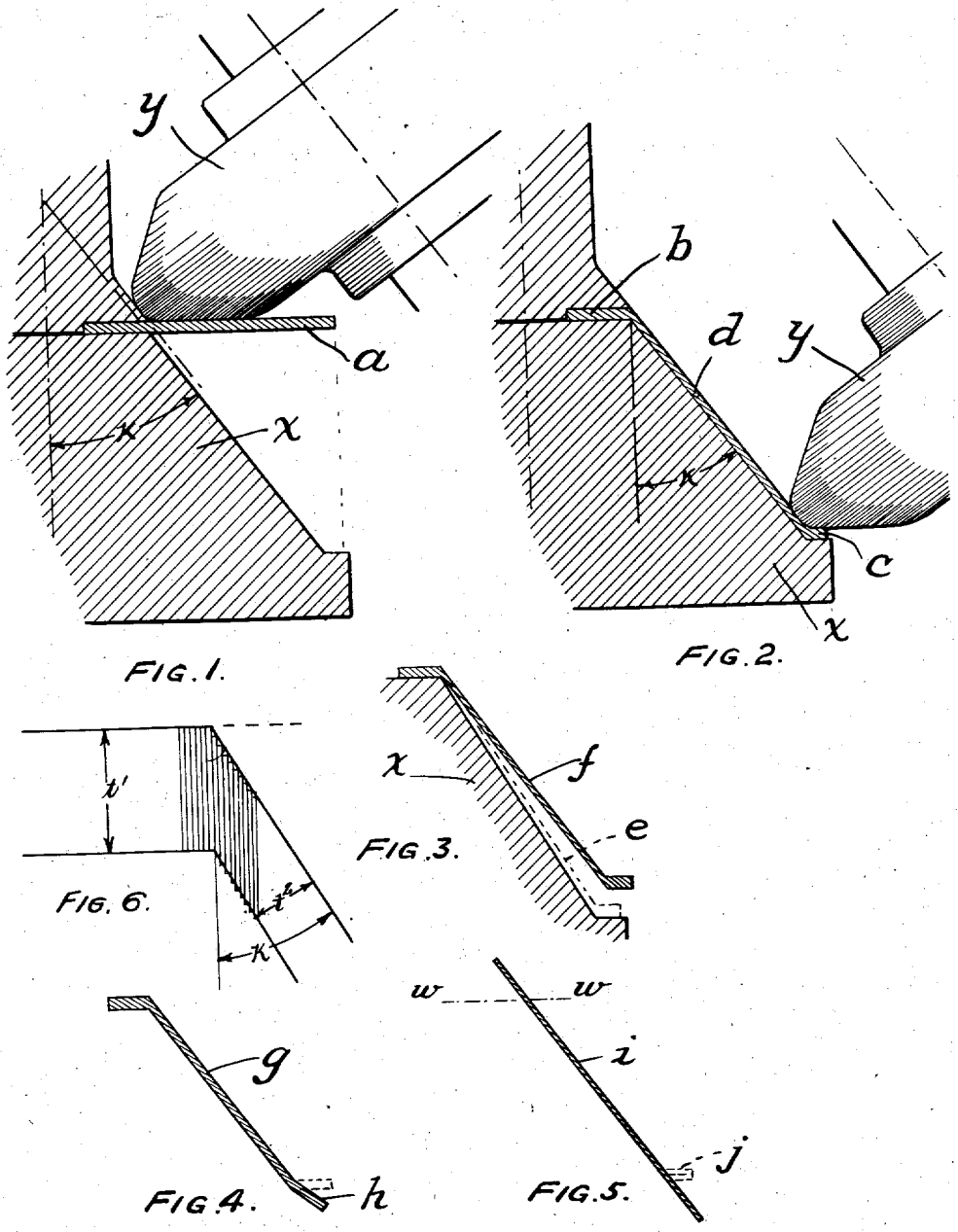
INVENTOR
Hans Olof Lindgren
BY
Busser and Harding
ATTORNEYS.
WITNESS:
Robt R. Mitchel.

Reissued Dec. 17, 1935 Re. 19,790

UNITED STATES PATENT OFFICE 19,790

PROCESS OF PRODUCING CONICAL DISKS FOR CENTRIFUGAL SEPARATORS

Hans Olof Lindgren, Appelviken, Sweden, assignor to The De Laval Separator Company, New York, N. Y., a corporation of New Jersey Original No. 1,939,356, dated December 12, 1933, Serial No. 399,408, October 12, 1929. Application for reissue September 12, 1934, Serial No. 743,778. In Germany November 3, 1928

8 Claims. (Cl. 113—52)

Centrifugal separator bowls, particularly cream separators, are usually provided with a series of superposed plates of frusto-conical shape, popularly called "disks", which divide the separating space of the bowl into thin strata and greatly promote efficient and rapid separation. Each of these disks or cones is usually provided with an outwardly extending peripheral flange at its wider end and an inwardly extending flange at its narrow end. Since one of the factors on which the skimming efficiency of a bowl depends is the division of the separating space of the bowl into the largest practicable number of layers, it is desirable to make the conical portion of the disk as thin as possible so that the largest practicable number of disks may be placed within the bowl. On the other hand, the peripheral flanges should be as thick as is consistent with the maintenance of flanges of adjacent disks properly spaced apart, because the thicker the flanges, the stiffer, and consequently the stronger, the disks. It is, of course, possible to make the flanges thicker than the conical disk body because the body extends at a steep angle to its axis while the flanges extend at a wide angle to the axis, normally, but not always, at a right angle thereto.

Heretofore the first stage of manufacture has involved the production of disks with conical body and flanges of uniform thickness, the conical body being subsequently thinned to the desired degree by turning or grinding. This method of production is, however, open to serious objections. Such disks, if of iron, are more exposed to rust than disks which have not been worked with cutting tools; probably because the surface of the material is compressed in the rolling operation and also because the original surface is less contaminated than the interior by slag impurities and gas bubbles. Further, the process is expensive, in that additional operations, for example, the turning, are necessary, and that the loss of the considerable quantity of material that is turned off is substantial and, especially in the production of disks of non-resistant metal, quite serious.

The present invention has for its object the production, as heretofore, of a disk comprising a thin conical mantle and thicker flanges, by a relatively simple and inexpensive process. It involves the production of such disks from sheet iron or other metal having, preferably, the same thickness as the inner flange, and the employment of a special spinning operation which effects such a reduction in the thickness of the material that the relation between the thickness of the conical portion, measured at right angles to the generatrix of the cone, and the thickness of the original sheet iron is equal to or smaller than the sine of the half top angle of the cone.

By the half top angle of the cone is meant that angle which is formed, in a vertical section taken through the axis of the conical mantle, between such axis and the wall of the conical body of the mantle.

In order to obtain the desired displacement of material it is necessary that the sheet iron shall have a suitable hardness. In the spinning operation, the initial blank should have the shape of a flat sheet of even thickness and should be positioned at about right angles to the axis of the spinning element.

If the desired relation between the thickness of the conical mantle and that of the flanges shall be equal to the sine of the half top angle of the cone, the semi-manufactured disk can be produced in a single operation.

If the desired relation between the thickness of the conical mantle and that of the flanges shall be less than the sine of the half top angle of the cone, the spinning operation should be such as to produce a semi-manufactured disk whose top angle is smaller than that of the finished disk. The disks can then be shaped to final form and finished by pressing or by the usual spinning.

If the desired thickness of the outer flange is less than of the original material but greater than that of the conical mantle, I produce, by spinning, a semi-manufactured disk in the shape of two conical mantles, one below the other, the top angle of the lower mantle being made greater than that of the upper mantle. By bending up the lower mantle to form a flange, there is obtained a disk having a body of the desired reduced thickness, an inner flange having the same thickness as that of the original material, and an outer flange whose thickness is less than that of the inner flange but greater than that of the conical body.

In the production of disks of rustless metal, it is possible to proceed as follows: A semi-manufactured disk in the shape of a frustum of a cone is produced by spinning. The upper part is bent to form the inner flange of the disk. The outer flange is formed by bending up the lower part of the cone to form a flange of twice the desired width and then bending this flange upon itself (double-bending) to form a flange of twice the thickness of the conical body. By this procedure a stiff outer flange is obtained, since the material of the flange during the manufacture is also exposed to cold-working so that the elastic limit of the material is considerably increased.

The several described mechanical manipulations constituting illustrative embodiments of my invention are shown in the accompanying drawing, in which:

Fig. 1 is a diagrammatic view of a disk blank, a die and clamp for holding the disk, and a spinning roller which cooperates with the die to shape the disk.

Fig. 2 is a view, similar to Fig. 1, showing the disk spun to shape.

Figs. 3, 4 and 5 are diagrams showing modified manipulations embodying my invention.

Fig. 6 is a diagram showing the relation of the thickness of the conical body to that of the original blank.

In Fig. 1 a die *x* (shown broken away) having a conical periphery has clamped against its upper face a flat disk blank *a* of uniform thickness. A spinning roller *y* spins the blank into the shape shown in Fig. 2 by moving in a fixed path, indicated by the dotted lines in Figs. 1 and 2, parallel to the surface of the conical die and at a distance therefrom equal to the thickness of the blank *a* multiplied by the sine of the half top angle of the conical portion to be formed. In Fig. 2 the disk comprises an upper (inner) flange *b* having the thickness of the original blank, a lower (outer) flange *c* having the thickness of the original blank, and a frusto-conical body *d* whose thickness relative to that of the original blank is equal to the sine of the half top angle of the cone.

In Fig. 3 the disk is produced by the same operation, but the body is thinner than in Fig. 2. This greater thinness is produced by first forming a body *e* (shown in broken lines) whose top angle is smaller than that of the finished disk and then expanding the body into its ultimate shape as indicated at *f*.

In Fig. 4 the upper part of the die has a periphery inclined at a relatively small angle to its axis and the lower part of the die has a periphery inclined at a relatively large angle to the axis, so that, at the conclusion of the spinning operation a disk body is formed having an upper frusto-conical part *g* extending at a relatively sharp angle to its axis and a lower frusto-conical part *h* extending at a relatively wide angle to such axis. The lower part *h* is of greater thickness than the upper part *g* and is bent up, as shown in broken lines, to form the lower (outer) flange. The lower part *h*, when bent out to form the lower flange, is of greater thickness than that of the body but of less thickness than that of the original blank.

In Fig. 5 a frustrum *i* of a cone, of the desired thickness of the body, is produced by spinning. The upper part is bent in on the line *w*—*w* to form the upper or inner flange. The lower flange *j* is formed by double-bending, as shown in broken lines in the figure.

The angle *k* in Figs. 1, 2 and 6 is the half top angle of the cone. If we assume that the blank is made up of many parallel strata perpendicular to its surface and that in spinning these strata are all displaced in the direction of their length as shown in Fig. 6, it may be readily seen that a cone with half top angle *k* made from a blank with thickness $t_1$ will have a thickness $t_2 = t_1 \sin k$.

The invention is not limited to the above described and illustrated embodiments, which illustrate several of numerous specific variations.

The terms "upper" or "inner" and "lower" and "outer" are used, in their relative sense, for convenience only, and are in accordance with the positions that the disks have in the usual bowl rotatable on a vertical axis. It will be understood, however, that in the spinning operation the axis of the machine may be horizontal, in which case the blank would not be clamped against the "upper" face of the die.

What I claim and desire to protect by Letters Patent is:

1. That process of manufacturing centrifugal separator disks having flat flanges and an intermediate frusto-conical body, which comprises forming a flat circular disk blank of approximately the same diameter as the finished disk, placing it on a conical form and by rolling an intermediate zone, displacing the material therein axially only to form it into a frusto-conical surface.

2. That process of forming centrifugal separator disks having relatively thick flat flanges and an intermediate relatively thin frusto-conical body, which comprises forming a flat circular disk blank of a diameter approximately the same as that of the finished disk and of a thickness equal to that desired in the flanges, placing it on a frusto-conical form and by rolling an intermediate zone in the blank displacing the material axially only to form said thin frusto-conical body leaving the inner and outer portions unchanged to form relatively thick flanges.

3. In the manufacture of separator disks having inner and outer flanges and a conical intermediate body, the process which comprises forming a flat circular disk blank of a diameter approximately equal to that of the finished disk and of a thickness substantially greater than the desired thickness of the conical intermediate body of the finished disk, placing the blank on a conical form, subjecting that intermediate portion of the blank extending from the desired outer diameter of the inner flange to the desired inner diameter of the outer flange to a spinning operation adapted to only axially displace said intermediate portion and thereby reshape it into a conical body having substantially the same minimum and maximum diameters as said intermediate portion of the blank and simultaneously with such change in shape reduce the thickness of said intermediate portion so that it is equal to the thickness of the original blank multiplied by the sine of the half top angle of the conical portion.

4. In the manufacture of centrifugal separator disks having relatively thick inner and outer flanges and a relatively thin frusto-conical intermediate body, the process which comprises forming a flat circular disk blank of internal and external diameters approximately equal to that of the finished disk, placing it on a conical form, and subjecting only that intermediate part of the blank extending from the desired outer diameter of the inner flange to the desired inner diameter of the outer flange to a spinning operation adapted to so only axially displace the material of the blank as to reduce the thickness of and so elongate and expand said intermediate part as to reshape it into a frusto-conical body having substantially the same minimum and maximum diameters as said intermediate part of the blank, the resultant disk comprising a frusto-conical body composed substantially solely of the metal of said intermediate portion and end flanges from or into which substantially no metal has been drawn or forced in the spinning operation.

5. The process of forming articles having a taper portion which comprises forming a flat circular blank of approximately the same diameter as the greatest diameter of the finished article, placing it on a conical form and by rolling a zone thereof displacing the material therein axially only to form it into a frusto-conical taper portion.

6. The process of forming articles having a taper portion which comprises forming a flat circular blank of approximately the same diameter as the greatest diameter of the finished article, placing it on a form having the shape of the interior of the taper and by rolling a zone thereof displacing the material therein axially only to form it into taper portion.

7. The process of forming articles having a taper portion which comprises forming a flat circular blank of approximately the same diameter as the greatest diameter of the finished article, placing it on a conical form and by rolling a zone thereof displacing the material therein axially only to form it into a frusto-conical taper portion having a thickness approximately equal to that of the original blank multiplied by the sine of one-half the top angle of the conical portion.

8. The process of forming articles having a taper portion which comprises forming a flat circular blank of approximately the same diameter as the greatest diameter of the finished article, placing it on a form having the shape of the interior of the taper and by rolling a zone thereof displacing the material therein axially only to form it into taper portion having at each point thereof a thickness approximately equal to that of the original blank multiplied by the sine of one-half the inner angle of the taper at said point.

HANS OLOF LINDGREN.